United States Patent [19]

Dumont

[11] Patent Number: 5,349,195
[45] Date of Patent: Sep. 20, 1994

[54] SPECTROSCOPY METHOD FOR HIGH COUNT RATE NUCLEAR PULSES

[75] Inventor: Alain M. G. Dumont, Machida, Japan

[73] Assignee: Schlumberger Technology Corporation, Houston, Tex.

[21] Appl. No.: 8,920

[22] Filed: Jan. 26, 1993

[30] Foreign Application Priority Data

Jan. 30, 1992 [FR] France ............... 92 00999

[51] Int. Cl.⁵ ............................. G01T 1/17
[52] U.S. Cl. ...................... 250/395; 250/262; 250/369; 328/117
[58] Field of Search ............ 250/395, 369, 262; 307/308, 358; 328/155, 115, 117

[56] References Cited

U.S. PATENT DOCUMENTS

| | | | |
|---|---|---|---|
| 4,481,597 | 11/1984 | Robbins | 250/262 |
| 4,629,894 | 12/1986 | LeLong | 250/369 |
| 4,692,626 | 9/1987 | Westphal | 250/395 |
| 5,067,090 | 11/1991 | Seeman | 250/269 |

FOREIGN PATENT DOCUMENTS 0396464 7/1990 European Pat. Off. .

OTHER PUBLICATIONS

Patent Abstracts of Japan-vol. 10, No. 41, Feb., 1986 (JP-A-60-187877).

*Primary Examiner*—Carolyn E. Fields
*Attorney, Agent, or Firm*—Henry N. Garrana; John H. Bouchard

[57] ABSTRACT

The invention relates to a spectroscopy method for analysing high count rate pulses in an electrical signal s(t) emitted by a radiation detector. The method comprises analogically sampling the signal s(t) and integrating the sampled signal over a duration equal to the sampling period (T); converting the sampled signal into digital samples; detecting pulses on the basis of the digital filtered samples, and determining the energy spectrum from the detected pulses.

The invention is applicable to detecting nuclear particles and radiation in well logging techniques.

8 Claims, 2 Drawing Sheets

SPECTROSCOPY METHOD FOR HIGH COUNT RATE NUCLEAR PULSES

BACKGROUND OF THE INVENTION

The invention relates to a spectroscopy method for nuclear pulses obtained at the output from a detector such as a photomultiplier detector having a scintillator crystal.

Such methods are used in numerous technical fields that require nuclear particles and radiation to be detected. This method applies, for example, to performing well logging measurements in a subsurface formation.

To perform such logging measurements, a tool is used which is displaced along a borehole passing through various different subsurface formations.

The tool performs physical measurements of the subsurface formation and transmits them after real-time processing to the surface, to means for performing further processing and to means for making use thereof.

Of the various technical measurements used in well logging, spectroscopy performed by means of a spectroscopic tool is used to determine the characteristics of the various constituent parts of the subsurface formation.

In general, the energy spectrum is obtained either by detecting natural γ rays, or by detecting γ rays emitted by a source and after they have interacted with the electrons of the constituent materials of such formation, or else by detecting γ rays that result from interactions between the nuclei of the constituent materials and neutrons emitted by a source. A detector then serves to detect the radiation and to transform it into an electrical pulse signal whose amplitude is a measure of the γ ray energy.

Further details may be obtained from the manual "Handbook on detection and measurement" by Glenn F. Knoll (1979) in which a nuclear pulse analyzer is described.

Reference may also be made to prior art constituted by European patent application No. 90 401 174.9 published under the number EP 0 396 464, in which a spectroscopic method is described as applied to a well logging tool for performing nuclear logging.

The method described in that prior art comprises filtering the analog signal constituted by electrical pulses supplied by the radiation detector in order to perform Gaussian type shaping. The method then comprises performing analog-to-digital conversion of the signal, followed by pulse detection by comparing the amplitudes of samples with a predetermined threshold.

That method also makes it possible, when so required, to change the baseline of the signal when the amplitude of a sample lies beneath said line.

SUMMARY OF THE INVENTION

Unlike conventional methods, and in particular unlike the teaching provided by said European patent application EP 0 396 464, in which pulses are detected from digital samples, the method of the present invention comprises performing detection after the signal has been sampled and integrated then converted to digital samples, in such a manner as to concentrate all of the energy of the signal on a limited number of samples.

Compared with conventional techniques, this characteristic presents the advantage of producing pulses that are shorter and consequently of making higher count rates possible.

In practice, and preferably, the method comprises the step of performing filtering so as to compress all of the energy of one pulse over the duration of two samples. Prior to analog-to-digital conversion of the signal, the method comprises the step of sampling the analog signal from the detector with integration over a duration equal to the sampling period.

More particularly, the present invention provides a spectroscopy method for analyzing high count rate pulses in an electrical signal s(t) emitted by a radiation detector, the pulses representing nuclear radiation, the amplitudes of the pulses being representative of the energy of particles in the radiation, the method comprising the steps of:

analogically sampling the signal s(t) with a sampling period (T) and integrating said sampled signal over a duration equal to said sampling period (T);

converting said integrated sampled signal to digital samples;

detecting pulses from said digital signal samples; and determining an energy spectrum from said detected pulses.

BRIEF DESCRIPTION OF THE DRAWINGS

The invention will be better understood from the following description given by way of non-limiting example and made with reference to the accompanying drawings, in which.

DETAILED DESCRIPTION OF A PREFERRED EMBODIMENT

The method described below is applicable to any field in which electrical pulses obtained by detecting radiation are subjected to analysis, e.g. pulses detected using a crystal scintillator using a crystal of NaI or of GSO, in association with a photomultiplier.

The invention is particularly applicable to well logging measurements performed in a borehole by means of a logging tool lowered down the borehole. Reference may be made, for example, to the description of such a tool given in European patent application No. 90 401 174.9 published under the number EP 0 396 464.

During a first processing stage (block 10 in FIG. 1), the electrical signal s(t) emitted by the detector in the form of analog pulses corresponding to the nature of the detected radiation is digitized and optionally shaped so that the energy of each pulse lies within a time slot of fixed duration.

During a second processing stage (block 20 in FIG. 1), pulses are detected on the basis of the digital signal, optionally as shaped. The end of this stage 20 provides an energy spectrum of the detected pulses.

In one embodiment, the first stage 10 comprises the processing steps of sampling the analog signal s(t) and integrating the signal over a selected sampling period T by means of any conventional and commercially available analog integrating sampler circuit.

Figure 2:
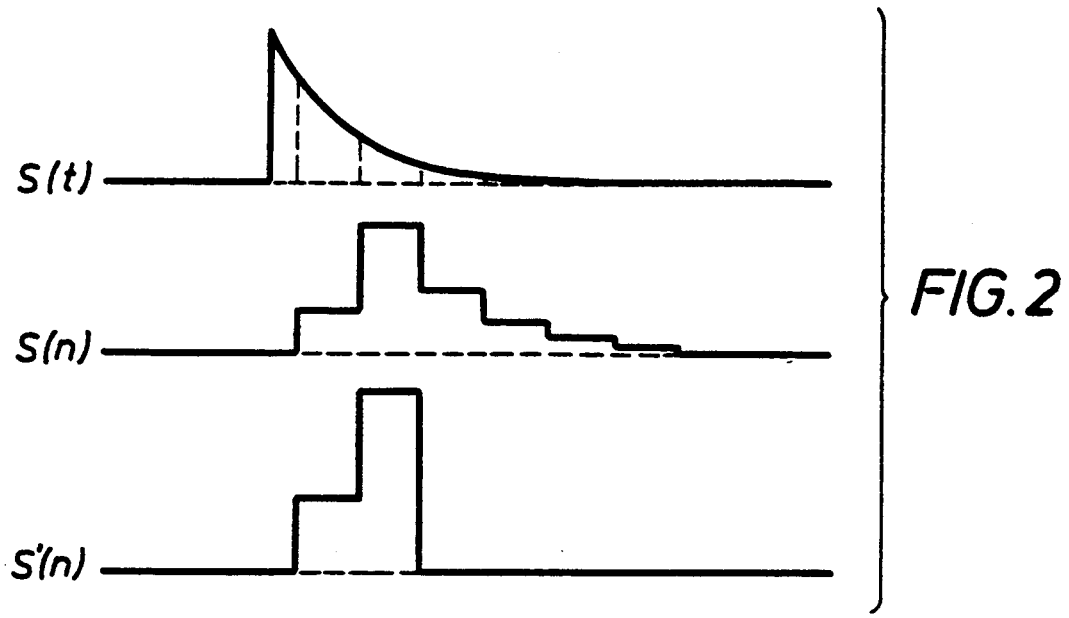
FIG. 2 shows one example of the signal s(t) as detected and processed in accordance with the method of the invention.
Figure 3:
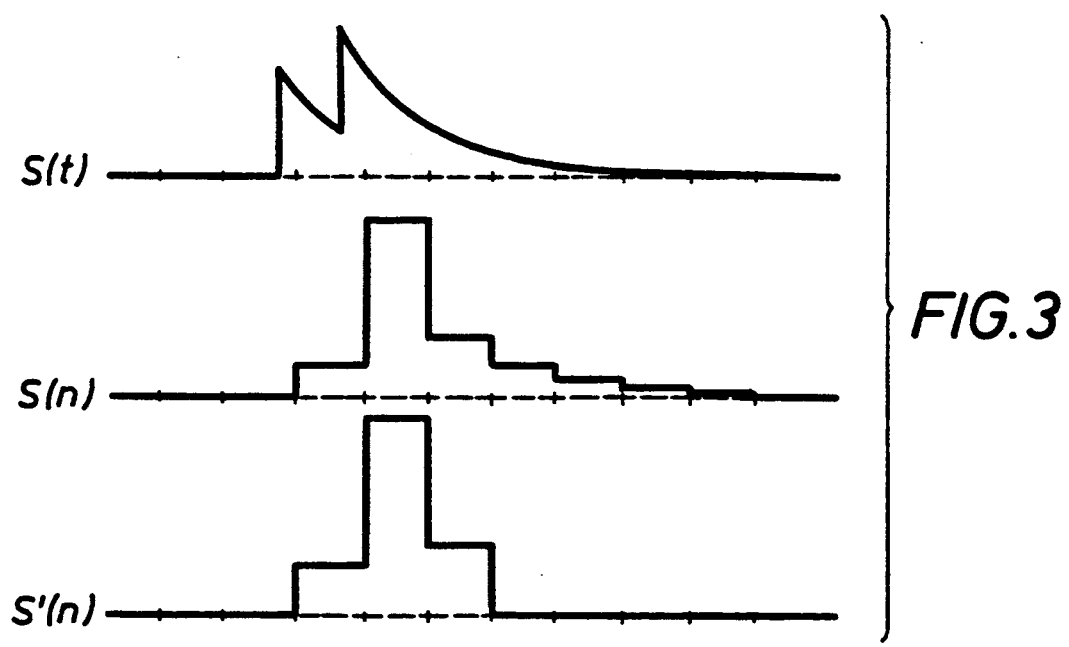
FIG. 3 shows a second example of the detected and processed signal s(t).

Reference may be made at this stage to FIGS. 2 and 3 which show examples of different signals s(t). The signal obtained after the sampling and integration operation Is a signal s(n). The sampling and integration operation takes place continuously on the signal s(t) provided by the detector.

Each sample s(n) delivered by the sampler and integrator is the integral of the input signal s(t) representative of the data over a sampling interval $T = t_n - t_{n-1}$.

$$s(n) = \int_{t_{n-1}}^{t_n} s(t) \cdot dt$$

A single pulse arriving at instant $t_a$ and having amplitude A can be expressed as an exponential function of time:

$$s(t) = 0 \text{ for } t < t_a$$

$$s(t) = (A/\tau)e^{(t_a - t)/\tau} \text{ everywhere else.}$$

For such a signal, assuming that $t_0 < t_a < t_1$, the sampling and integrating step provides the following sequence of samples:

$$s(0) = 0$$

$$s(1) = A[1 - e^{(t_a - T)/\tau}]$$

$$s(2) = A[e^{(t_a - T)/\tau} - e^{(t_a - 2T)/\tau}]$$

$$s(3) = A[e^{(t_a - 2T)/\tau} - e^{(t_a - 3T)/\tau}] = s(2)e^{-T/\tau}$$

$$s(4) = A[e^{(t_a - 3T)/\tau} - e^{(t_a - 4T)/\tau}] = s(3)e^{-T/\tau}$$

$$\ldots$$

$$s(n) = s(n - 1)e^{-T/\tau}$$

i.e.: $\sum_{n=0}^{\infty} s(n) = A = \int_{t_a}^{\infty} s(t) \cdot dt$

The analog signals are converted by an analog-to-digital converter (step 2 in FIG. 1) and are then filtered by a digital filter (step 4 in FIG. 1) in a manner which is explained below:

The filter serves to eliminate the phenomenon of exponential evanescence. The filter has a finite impulse response for a duration of one sampling period:

$$s'(n) = (1 + \alpha)s(n) - \alpha s(n - 1)$$

where $$\alpha = e^{-T/\tau}/(1 - e^{-T/\tau})$$

In this embodiment, the signal corresponding to a received pulse is compressed to two successive samples:

$$s'(0) = 0$$

$$s'(1) = A(1 - e^{(t_a - T)/\tau}/(1 - e^{-T/\tau})$$

$$s'(2) = A(e^{(t_a - T)/\tau} - e^{-T/\tau})/(1 - e^{-T/\tau})$$

$$s'(3) = 0$$

$$\ldots$$

$$s'(n) = 0$$

The method also comprises performing a servo-controlled operation (steps 3 and 5) enabling the baseline B of the signal to be adjusted prior to filtering. The baseline B corresponds to the DC level of the signal. This level is adjusted to a predetermined value and it is readjusted by a feed back loop.

The detection stage 20 serves to provide a constant level corresponding to the baseline in the absence of pulses. Updating step 5 consists in memorizing said level in a memory to enable correction to be performed at the desired instants before filtering.

An impulse detection step 11 comprises, in this first embodiment, fixing a detection threshold Tr, and then taking account of the signal samples at each sampling instant in groups, and in this particular example in groups of four.

Thus, at sampling instant tn, the following samples are selected: s'(n), s'(n+1), s'(n+2), and s'(n+3).

Detection consists in verifying whether the first and last sample in the group are less than or equal to the fixed threshold, which can be written as follows:

$$s'(n) \leq Tr$$

and $$s'(n+3) \leq Tr$$

and whether at least the first intermediate sample s'(n+1) is greater than said threshold, i.e.:

$$s'(n+1) > Tr$$

If these two conditions are satisfied, then a pulse is detected and its amplitude is given by:

$$A = s'(n+1) + s'(n+2)$$

Figure 1:
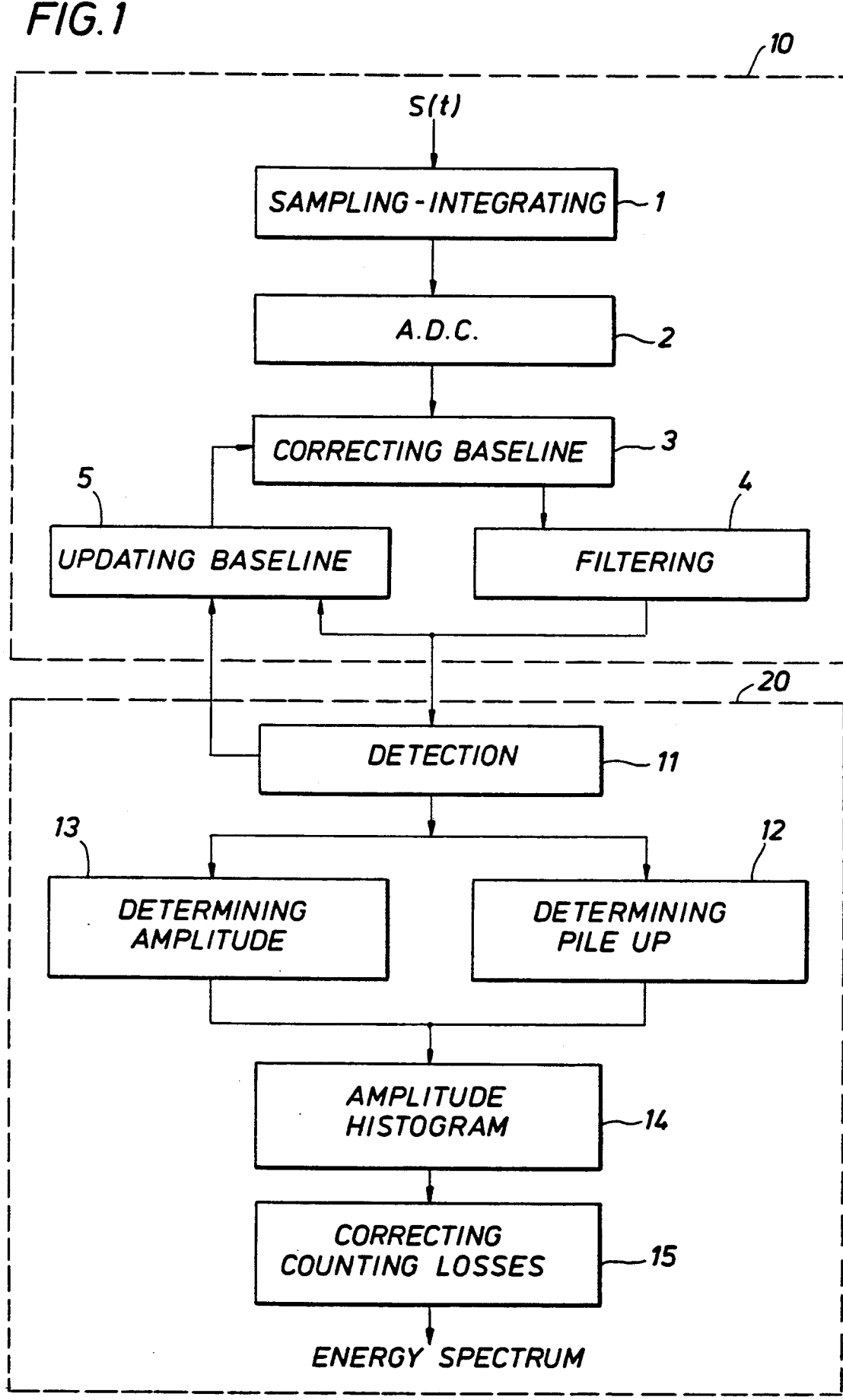
FIG. 1 is a flow chart showing the various steps and substeps of the method of the invention in the form of a sequence of functional blocks.

This step is represented by block 13 in FIG. 1.

Otherwise, i.e. when the above two conditions are not satisfied, that means either that there is no signal, or else that the pulse is not at the current position (there may have been a pulse at some instant other than the instants tn+1 and tn+2), or else that a plurality of pulses are overlapping or piled up. After checking these conditions, n is incremented by one so as to move on to the following group of samples n+1, n+2, n+3, and n+4, and so on until there is no more signal.

Where appropriate, it is possible, as mentioned at step 12 of FIG. 1, to determine pulses even where a pile-up phenomenon has occurred.

Reference may be made to FIG. 3 which illustrates this phenomenon.

To perform a measurement in spite of pile-up as shown by the signal s(t) in FIG. 3, one solution consists in selecting samples in groups of five and in incrementing by one sample after each measurement, i.e. taking five samples s'(n), . . . , s'(n+4).

The method then consists in checking the following conditions for the group of samples:

for the first and last samples:
$s'(n) \leq Tr$ and
$s'(n+4) \leq Tr$
and for the other samples:
$s'(n+1) > Tr$ $s'(n+2) > Tr$ and
$s'(n+3) > Tr$ If these conditions are satisfied, then a pile up has been detected and its amplitude A is equal to:

$$A = s'(n+1) + s'(n+2) + s'(n+3)$$

This step 12 thus makes it possible when two or more pulses arrive during two successive sampling periods (as shown in FIG. 3) to detect this phenomenon and to measure it.

Thus, the sum of the three samples which represents the sum of the pulses is used for quantifying the pile up, thereby making it possible, if so desired, to correct the measurements obtained at step 13.

After implementing step 13 and possibly also step 12, one or more amplitude histogram(s) are made (step 14). The energy spectrum is thus determined after possibly correcting the histograms for counting losses (step 15).

The method of the invention is implemented using analog and digital circuits as are commercially available or using special integrated circuits.

An analog circuit is used for performing sampling and integrating step 1 and for performing analog-to-digital conversion step 2.

Digital circuits are used for performing the filtering step and the pulse detection step.

Digital signal processors may be used, for example, for performing steps 12, 14, and 15.

I claim:

1. A spectroscopy method for analyzing high count rate pulses in an electrical signal emitted by a radiation detector, said pulses representing nuclear radiation, the amplitude of said pulses being a representation of the energy of particles in the radiation, the method comprising the steps of:
    analogically sampling said electrical signal with a sampling period and integrating the sampled signal over a duration equal to said sampling period;
    converting the integrated sampled signal to digital samples;
    detecting pulses from said digital samples; and
    determining an energy spectrum from said pulses.

2. The spectroscopy method according to claim 1, further including the step of filtering the digital samples to shape said pulses before said detecting step.

3. The spectroscopy method according to claim 2, wherein said filtering step comprises compressing the digital samples over a duration of two samples.

4. The spectroscopy method according to claim 1, wherein said detecting step comprises the steps of:
    selecting a group of at least four successive digital samples;
    comparing the first sample and the last sample of said group with a predetermined threshold to determine a first condition where said samples are less than or equal to said threshold;
    comparing at least one of the intermediate samples of said group with said threshold to determine a second condition where the amplitude of said at least one sample is greater than said threshold; and
    detecting a pulse when said first and second conditions are satisfied.

5. The spectroscopy method according to claim 4, further comprising the step of determining the amplitude of the detected pulse by summing the amplitudes of the intermediate samples in a group.

6. The spectroscopy method according to claim 1, wherein said pulse detecting step further includes detecting a pile up of said pulses.

7. The spectroscopy method according to claim 6, wherein said pile up detecting step comprises the steps of:
    selecting a group of at least five samples;
    comparing the first sample and the last sample of said group with a predetermined threshold to determine a first condition where the amplitudes of said first and last samples are less than or equal to said threshold;
    comparing the intermediate samples of said group with said threshold to determine a second condition where their amplitudes are greater than said threshold; and
    detecting a pile up when said first and second conditions are satisfied.

8. The spectroscopy method according to claim 1, further including the step of correcting the baseline of the digital sample signal before said pulse detecting step, said correcting step comprising:
    determining a new value of said baseline when the difference between the level of a sample and the level of the baseline is less than the detection threshold; and
    injecting said new value of the baseline prior to said pulse detecting step.

* * * * *